United States Patent
Hegde et al.

(10) Patent No.: US 7,779,385 B2
(45) Date of Patent: Aug. 17, 2010

(54) METHOD AND SYSTEM FOR AUTOMATED COMPONENT PRODUCT INTEGRATION

(75) Inventors: Prabhat L. Hegde, Santa Clara, CA (US); Gowri Sivaprasad, Santa Clara, CA (US)

(73) Assignee: Oracle America, Inc., Redwood City, CA (US)

(*) Notice: Subject to any disclaimer, the term of this patent is extended or adjusted under 35 U.S.C. 154(b) by 1133 days.

(21) Appl. No.: 11/382,558

(22) Filed: May 10, 2006

(65) Prior Publication Data

US 2007/0266038 A1 Nov. 15, 2007

(51) Int. Cl.
G06F 9/44 (2006.01)

(52) U.S. Cl. .............. 717/107; 717/101; 717/102; 717/103; 717/108; 717/116; 707/602; 707/620; 707/690; 715/239

(58) Field of Classification Search ......... 717/100–103, 717/107, 116, 108; 707/602, 610, 611, 620, 707/690; 719/311; 715/203, 239
See application file for complete search history.

(56) References Cited

U.S. PATENT DOCUMENTS

| | | | | |
|---|---|---|---|---|
| 5,805,889 A | * | 9/1998 | Van De Vanter | 717/107 |
| 6,083,276 A | * | 7/2000 | Davidson et al. | 717/107 |
| 6,912,522 B2 | * | 6/2005 | Edgar | 1/1 |
| 6,961,712 B1 | * | 11/2005 | Perkowski | 705/27 |
| 7,117,051 B2 | * | 10/2006 | Landry et al. | 700/83 |
| 7,127,700 B2 | * | 10/2006 | Large | 717/100 |
| 7,188,158 B1 | * | 3/2007 | Stanton et al. | 709/220 |
| 7,321,655 B2 | * | 1/2008 | Skakkebaek et al. | 379/88.25 |
| 7,607,137 B2 | * | 10/2009 | Hauser et al. | 719/318 |
| 2002/0087729 A1 | * | 7/2002 | Edgar | 709/246 |
| 2004/0015827 A1 | * | 1/2004 | Nicolle et al. | 717/104 |
| 2004/0044985 A1 | * | 3/2004 | Kompalli et al. | 717/100 |
| 2004/0044987 A1 | * | 3/2004 | Kompalli et al. | 717/100 |
| 2004/0158811 A1 | * | 8/2004 | Guthrie et al. | 717/103 |
| 2005/0097503 A1 | * | 5/2005 | Zintel et al. | 717/100 |
| 2005/0188350 A1 | * | 8/2005 | Bent et al. | 717/106 |
| 2005/0209876 A1 | * | 9/2005 | Kennis et al. | 705/1 |
| 2006/0080338 A1 | * | 4/2006 | Seubert et al. | 707/100 |
| 2007/0150387 A1 | * | 6/2007 | Seubert et al. | 705/31 |

OTHER PUBLICATIONS

Title: Towards an integrated, web-executable parallel programming tool environment, author: Park et al, source: ACM, publication date: Nov. 2000.*

Title: Software Maintainability Improvement Integrating Standards and Models, author: Chu et al, source: IEEE, publication year: 2002.*

* cited by examiner

*Primary Examiner*—Chameli C Das
(74) *Attorney, Agent, or Firm*—Martine Penilla & Gencarella, LLP (57) ABSTRACT

A method is provided for performing a component product integration synchronization. In the method, a component product extensible markup language (XML) schema is generated. A number of component products to be integrated together in a software system are then identified. A component product XML file is generated for each identified component product according to the generated component product XML schema. The generated component product XML files are used to verify compatibility of the identified component products when integrated together in the software system. Once compatibility of the identified component products is verified, the software system can be built with a high expectation of success.

20 Claims, 5 Drawing Sheets

METHOD AND SYSTEM FOR AUTOMATED COMPONENT PRODUCT INTEGRATION

BACKGROUND

An integrated software system includes a collection of separate software components that work together as a single entity. The separate software components are often developed and maintained by various software suppliers. In this case, the separate software components produced by the various software suppliers are brought together in an integration process to form the integrated software system. It should be appreciated that the integration process can be a difficult undertaking with regard to resolving complex inter-product and intra-product interface issues among the separate software components. For example, interface issues to be resolved may include: 1) use of different versions of supposedly common software blocks within the multiple software components, 2) use of shared system resources, e.g., ports, environment variables, memory (RAM), etc., by different software components, 3) different software components delivering their finished software on separate release cycles, 4) different software components running on separate release cycles, 5) conflicting dependencies among various software components, etc.

Difficulty with integration of separate software components to form a properly operating integrated software system can be exacerbated when the various suppliers of the software components work separately from each other with less than adequate communication. Considering the foregoing, a solution is needed to improve the efficiency of the integration process for developing and maintaining an integrated software system, particularly when various software components are supplied by separate software suppliers.

SUMMARY

In one embodiment, a method is disclosed for performing a component product integration sync. The method includes an operation for generating a component product extensible markup language (XML) schema. Another operation is provided for identifying a number of component products to be integrated together in a software system. A component product XML file is then generated for each identified component product according to the generated component product XML schema. Compatibility of the identified component products when integrated together in the software system is then verified using the generated component product XML files.

In another embodiment, a method is disclosed for generating a component product XML file to be used in performing a component product Integration synchronization (sync). A component product for which a component product XML file is to be generated is first identified. Then, a first tag in a component product XML schema is read. The tag is identified as representing either an executor tag or a static data tag. If the tag represents an executor tag, the method proceeds with running an executor specified by the executor tag, wherein the executor functions to retrieve data from an install unit associated with the identified component product. The data retrieved by the executor is then stored in the component product XML file being generated for the identified component product. If the read tag represents a static data tag, the method proceeds with retrieval of static data associated with the tag from a static data source. The data retrieved from the static data source is then stored in the component product XML file being generated for the identified component product. A next tag in the component product XML schema is then read and the method is repeated for the newly read tag. The method continues until each tag in the component product XML schema has been read once and in a sequential manner.

In another embodiment, a computer readable medium is disclosed as including program instructions for performing a component product integration sync. The computer readable medium includes program instructions for obtaining a component product XML schema. Program instructions are also included for obtaining a respective identifier for a number of component products to be integrated. Program instructions are provided for generating a component product XML file for each identified component product to be integrated. The component product XML file is to be generated according to the obtained component product XML schema. Additionally, program instructions are provided for verifying compatibility of the identified component products when integrated together to form a system. The compatibility of the identified component products is verified using the generated component product XML files.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

An integrated product or a suite of products, i.e., integrated software system, comes together to solve a specific customer problem. Example integrated products include 1) directory and identity services, 2) communication and collaboration services, 3) web and application services, and 4) high availability services. The integrated software system is a collection of individually developed software component products that are carefully assembled and integrated to provide the particular functionality of the integrated software system. Integration of the component products to form the integrated software can be done either at the end-user level or in the design and development phases of the integrated software system. It will be appreciated by those skilled in the art that integration of individually developed software component products to form a monolithic integrated software system can be a difficult and complex undertaking, particularly when the suppliers of the individual software component products work in a substantially independent manner from each other. Therefore, it is preferable to perform the integration process in the design and development phases of the integrated software system, rather than burden the end-user with the often daunting integration task.

Performance of the integration process in the design and development phases of the integrated software system remains a complex undertaking. For example, some component product interface issues that should be addressed in the integration process include: 1) component products within the integrated software system having their own set of "common" building blocks, 2) component products within the integrated software system having their own system resources such as ports, environment variables, file system allocations, memory allocations, etc., 3) component products within the integrated software system delivering into the same namespaces in the file system, 4) component products within the software system running on separate release cycles, and 5) component products within the software system having conflicting dependencies. Additionally, it should be appreciated that component products deliver their bits multiple times over the course of a release cycle of the integrated product. The method of the present invention provides an automated/hands-free and repeatable mechanism to build the integrated software taking into account the above-mentioned integration issues.

Figure 1:
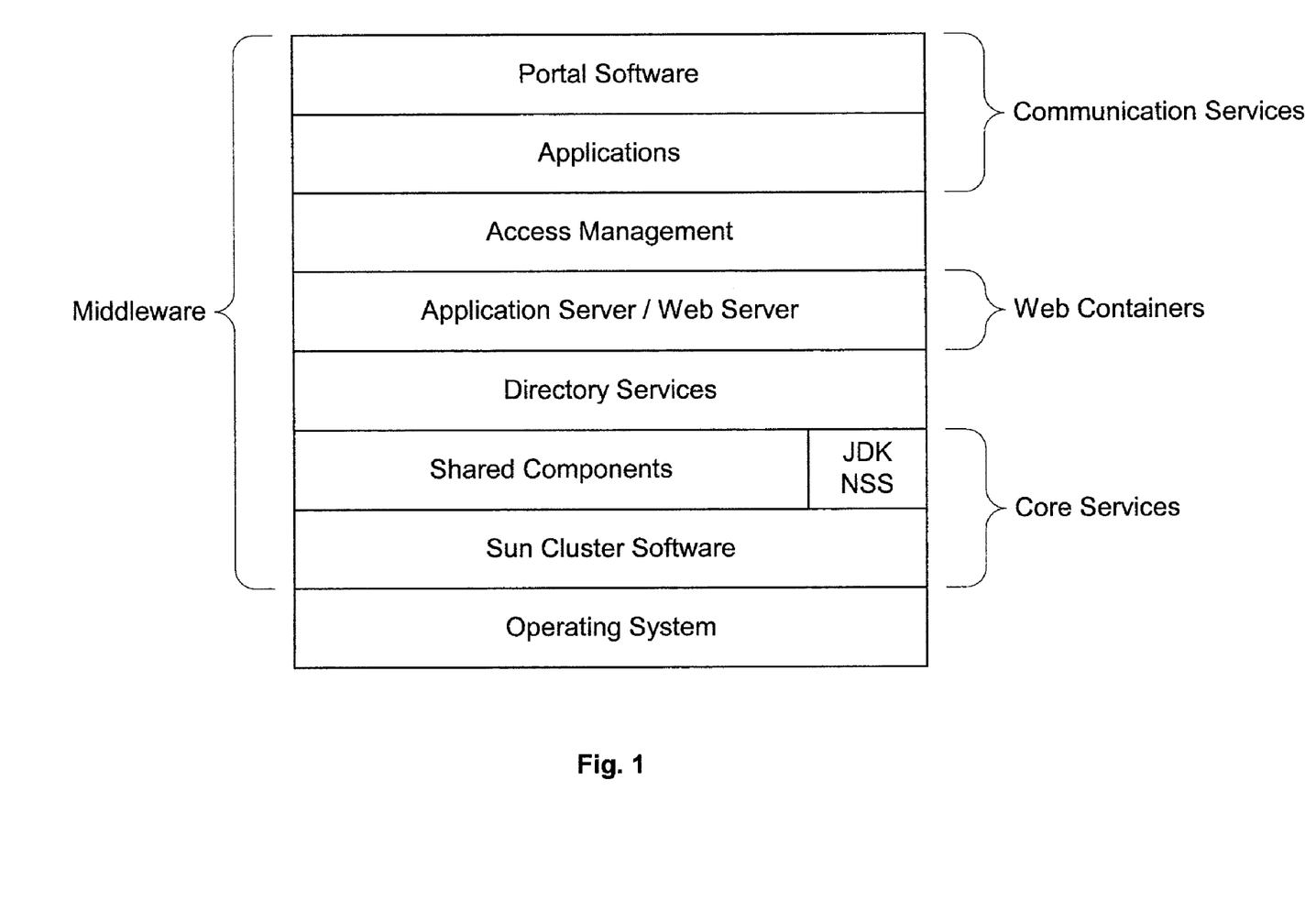
FIG. 1 is an illustration showing an example software stack of the Java™ Enterprise System (JES), in accordance with one embodiment of the present invention.

An example of an integrated software system is the Java™ Enterprise System (JES), provided by Sun Microsystems, Inc. FIG. 1 is an illustration showing an example software stack of the JES, in accordance with one embodiment of the present invention. The JES is represented as middleware residing above the operating system in the software stack. The JES includes software for providing core services, directory services and access management, web containers, and communication services. The software for providing core services resides directly above the operating system. The core services software includes a Sun cluster software component that communicates directly with the operating system. The core services software also includes shared components software that resides above and in communication with the Sun cluster software. Additionally, the core services software includes the Java Development Kit (JDK) software and network security services (NSS) software that resides above and in communication with the Sun cluster software.

Directory services software is defined to reside above and in communication with the core services software. Web container software, including application server software and web server software, resides above and in communication with the directory services software. Access management software resides above and in communication with the web container software. Communication services software resides above the access management software. The communication services software includes communication application software that resides above and in communication with the access management software. The communication services software also includes portal software that resides above and in communication with the application software.

While a detailed description of the particular functionality of the various software components in the JES is not required for understanding of the present invention, those skilled in the art should appreciate how the various software components within the JES work together to provide the particular functionality of the JES integrated software system. Furthermore, although communication of the various software components in the JES has been described in a downward direction through the software stack, it should be appreciated that each software component within the JES can communication in either an up or down direction through the software stack. Also, it should be appreciated that the JES depicted in FIG. 1 is presented for exemplary purposes and does not represent an inclusive set of software components of the JES. In other embodiments, the JES can include additional software components not shown in FIG. 1, or a variation of the software components shown in FIG. 1.

Considering the software stack of FIG. 1, it should be appreciated that the JES integrated software system includes a number of software component products that are required to interface with each other successfully in order for the JES integrated software system to function properly. Thus, integration of the JES software system should address the component product interface issues previously identified. Additionally, because the JES is intended to be implemented as platform-independent middleware, integration of the JES should also address issues associated with the platform independence. While the JES is described herein for exemplary purposes, it should be understood that the present invention is not limited to the JES. More specifically, it should be understood that the present invention can be used in conjunction with any integrated software system.

As will be described in more detail below, the present invention provides an integration sync process for resolving component product interface issues associated with an integrated software system, such as the JES, to enable successful and reliable building of the integrated software system. The integration sync process allows problematic component product interface issues such as dependencies and specifications to be identified and resolved in a pre-build phase. Thus, the integration sync process serves to increase the probability of having a successful integrated software system build. It should be appreciated by those skilled in the art that each build of an integrated software system can require substantial time and expense, particularly when the various software component product suppliers must be coordinated from geographically dispersed locations. Therefore, the component product interface issue resolution capability afforded by the integration sync process in the pre-build phase can provide time and expense savings by reducing the number of trial-and-error integrated system build operations.

The integration sync process is performed by an integration tool developed to analyze an install unit associated with each software component product ("component product" hereafter) to extract information pertinent to integration of the component product within the integrated software system. Information extracted from the install unit is compiled into an extensible markup language (XML) file associated with the component product. The XML file associated with the component product is referred to as the CP XML file, i.e., component product (CP) XML file. The CP XML file is generated based on a particular CP XML schema. Those skilled in the art should appreciate the use of schemas with respect to XML. Once the CP XML file is generated for each component product within the integrated software system, the information within the various CP XML files can be analyzed to identify and resolve component product interface issues, i.e., issues associated with component product specifications and dependencies, prior to performing the integrated software system build operation.

Figure 2:
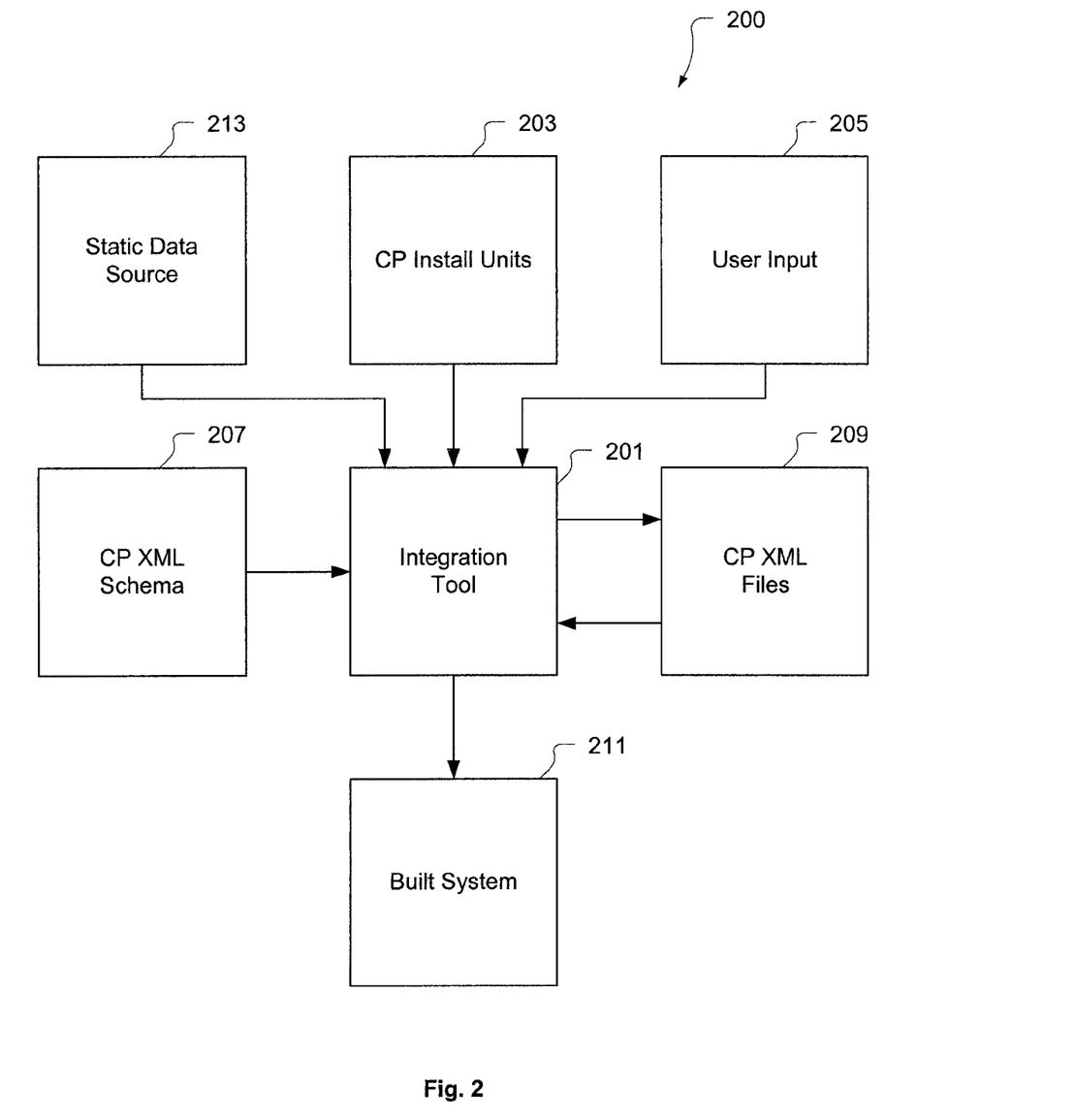
FIG. 2 is an illustration showing a system for implementing the integration sync process, in accordance with one embodiment of the present invention.

FIG. 2 is an illustration showing a system 200 for implementing the integration sync process, in accordance with one embodiment of the present invention. As will be described below, the system 200 includes a number of data and software components that are stored on computer readable media. The computer readable media can be defined as any means suitable for storing digital data in form that is accessible and readable by a computer processor. Common examples of computer readable media include hard disk drives, memory structures, optical storage disks, etc. The system 200 includes an integration tool 201. In one embodiment, the integration tool 201 is defined as a set of instructions stored on a computer readable medium that can be loaded and executed by a computer processor. In one embodiment, the integration tool 201 is implemented as a stand-alone computer program. In another embodiment, the integration tool 201 is implemented as a script to be executed by another computer program. It should be appreciated that the functionality provided by the integration tool 201 remains essentially the same regardless of the particular implementation embodiment.

The system 200 also includes a user input 205 defined to identify component products to be integrated together in generating the desired integrated software system. The user input 205 identifying the component products is provided to the integration tool 201 as input data. The user input 205 can be provided by a user through use of essentially any input means known to those skilled in the art. For example, the user input 205 can be provided in text form using a keyboard. Alternatively, the user input 205 can be stored in a file which is passed to the integration tool 201 for processing to extract the user input 205. In one embodiment, the file including the user input 205 can be defined using XML.

The system 200 further includes component product install units 203, wherein an install unit is provided for each component product identified in the user input 205. The install unit for each component product includes instructions and data for installing the corresponding component product. However, the install unit for each component product does not address component product interface issues associated with integrating the component product within the integrated software system. Thus, the instructions and data provided in each install unit is essentially defined to direct installation of the corresponding component product in a stand-alone manner, rather than as part of the integrated software system. The component product install units 203 are made accessible for use as input to the integration tool 201. Some example install units include 1) SVR4 Package (Solaris), RPM (Linux), Depot (HPUX), and MSI (Windows).

The system 200 also includes a CP XML schema 207 defined to direct generation of the CP XML file for each component product identified in the user input 205. The CP XML schema 207 includes a number of tags specifying elements and attributes which provide direction for generating a CP XML file. As will be familiar to those skilled in the art, the World Wide Web Consortium (W3C) has approved "XML Schema" as an official recommendation. Generally speaking, XML schemas express shared vocabularies and allow machines to carry out user-established rules. It should be appreciated, that XML schemas provide a means for defining the structure, content, and semantics of XML files, i.e., XML documents, using XML syntax. To be considered valid, elements and attributes in an XML document that is linked to a particular XML schema must follow the structure defined in the particular XML schema. Using a particular XML schema, software applications can exchange data in XML files that conform to the particular XML schema, thus ensuring data validity and interoperability.

Figure 3:
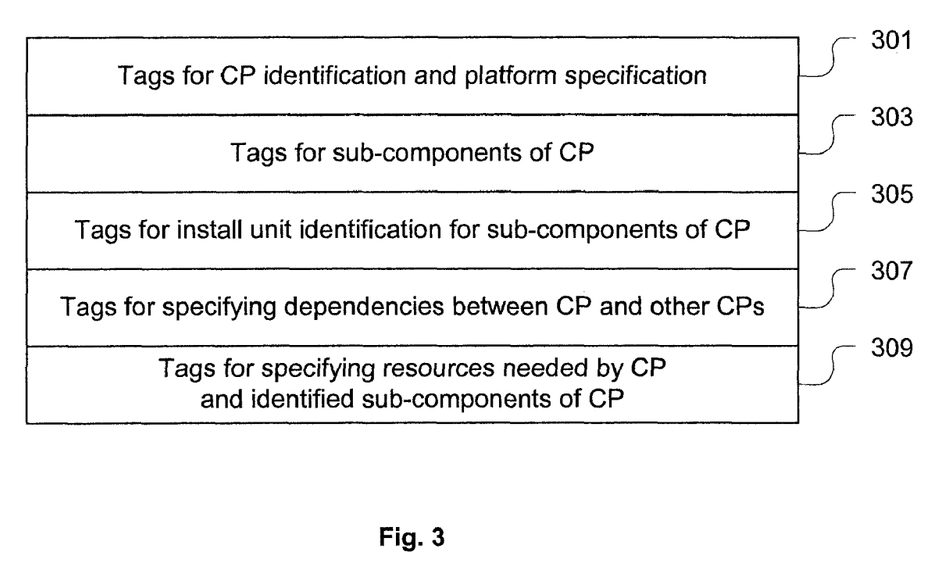
FIG. 3 is an illustration showing an organizational structure of the Component Product XML schema, in accordance with one embodiment of the present invention.

FIG. 3 is an illustration showing an organizational structure of the CP XML schema 207, in accordance with one embodiment of the present invention. A first section 301 of the CP XML schema 207 includes tags associated with identifying the component product and the platform specifications required by the component product. A second section 303 of the CP XML schema 207 includes tags associated with identifying sub-components of the component product. A fourth section 305 of the CP XML schema 207 includes tags associated with identifying install units of the sub-components of the component product, as identified in section 303. A fifth section 307 of the CP XML schema 207 includes tags associated with specifying dependencies between the component product and other component products. A sixth section 309 of the CP XML schema 207 includes tags associated with specifying resources required by the component product and its sub-components, as identified in section 303. In one embodiment, the resources specified according to the tags of section 309 include ports, environment variables, storage media locations, and memory locations, among others. It should be appreciated, however, that the resources specified according to the tags of section 309 can be any computer system resource required for the component product or its sub-components to be loaded and executed on the computer system.

For each component product identified in the user input 205, the integration tool 201 operates to process each line of the CP XML schema 207 from the first line through the last line to generate a CP XML file 209 corresponding to the component product. When the integration tool 201 encounters an executor tag within the CP XML schema 207, the integration tool 201 will direct an executor program associated with the executor tag to be run. The executor program functions to search the install unit of the component product for required information as indicated by the executor tag, extract the required information from the install unit, and return the required information to the integration tool 201. The integration tool 201 then stores the required information in an appropriate manner within the CP XML file 209 being generated for the component product.

When the integration tool 201 encounters a static data tag within the CP XML schema 207, the integration tool 201 will retrieve information specified by the static data tag from a static data source 213. In one embodiment, the static data source 213 is a file including data that is not subject to variation among the different component products that are to be integrated together to form the integrated software system. The integration tool 201 then stores the retrieved static data in an appropriate manner within the CP XML file 209 being generated for the component product.

After processing the CP XML schema 207 for each component product identified in the user input 205, a CP XML file 209 will exist for each component product to be integrated together to build the integrated software system. Based on the CP XML schema content described with respect to FIG. 3, it should be appreciated that a substantially complete set of information pertinent to resolving component product interface issues is provided within the various CP XML files 209. Therefore, once the CP XML file 209 has been generated for each component product, the content of the various CP XML files 209 can be analyzed by the integration tool 201 to identify and resolve component product interface issues that would serve to prevent a successful build of the integrated software system. In this manner, the various CP XML files 209 having been previously generated as an output of the integration tool 201 are in turn accessed as input to the integration tool 201.

If analysis of content of the various CP XML files 209 indicates that the specification and dependencies of the various component products are compatible for successful integration, the integration tool 201 will proceed with directing integration of the component products to build the integrated software system 211. During building of the integrated software system, the integration tool 201 uses the data present within the CP XML files 209 to install the respective component products. Thus, the component product install units 203 are not used to direct installation of the respective component products. Rather, the component product installation units 203 are used as a source of data relevant to installation of the respective component products. For example, as previously discussed, the component product install units 203 are "mined" for particular data during processing of executor tags within the CP XML schema 207. Additionally, during building of the integrated software system, the component product install unit 203 for a given component product is used to provide pointers to data and files necessary for installation of the given component product.

Figure 4:
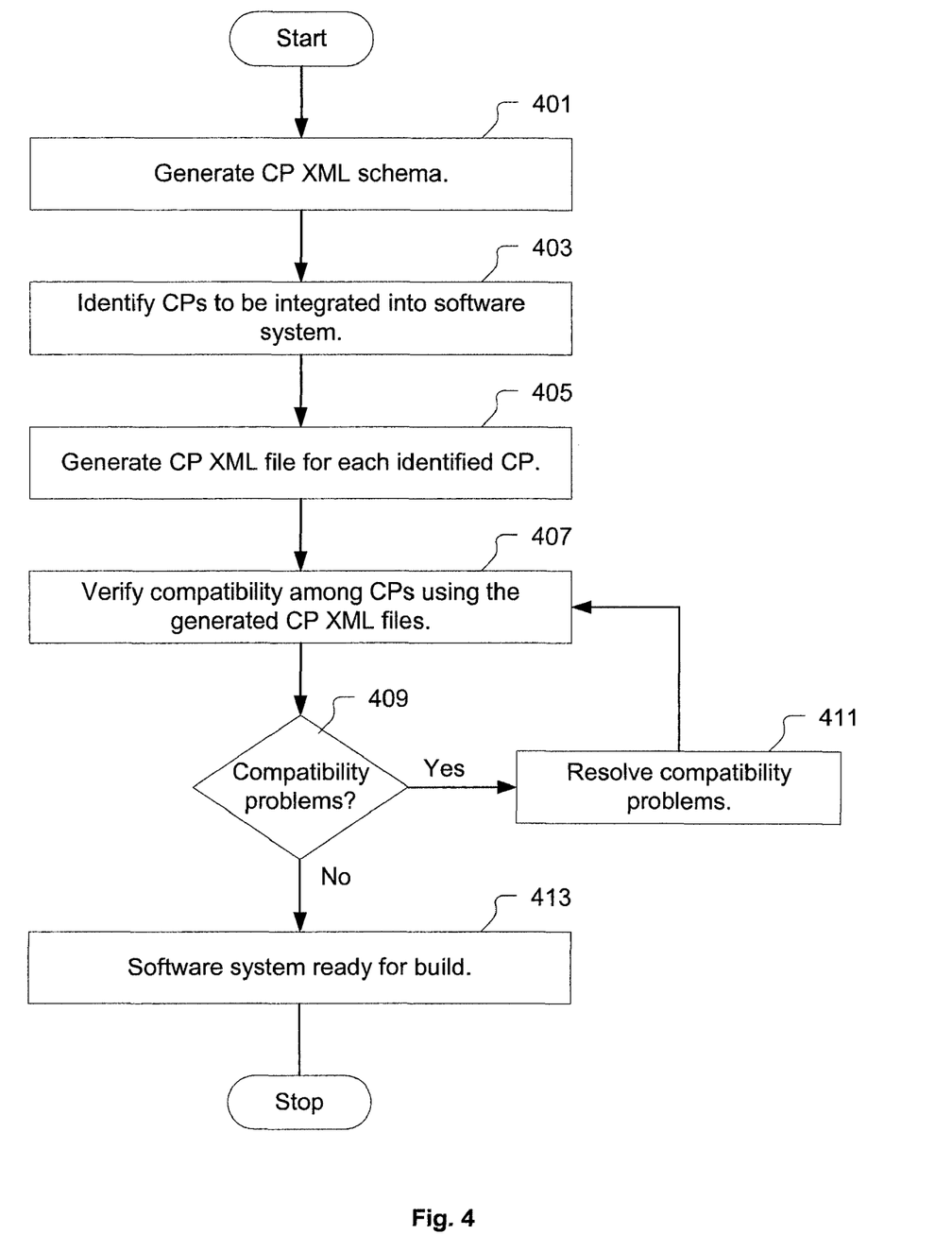
FIG. 4 is an illustration showing a flowchart of a method for performing a component product integration sync, in accordance with one embodiment of the present invention.

FIG. 4 is an illustration showing a flowchart of a method for performing a component product integration sync, in accordance with one embodiment of the present invention. The method includes an operation 401 for generating a CP XML schema. The generated CP XML schema corresponds to that previously described with respect to FIGS. 2 and 3. The CP XML schema includes a number of tags which define a framework of data necessary to describe implementation of a particular component product with the integrated software system. The tags within the CP XML schema can include executor tags and static data tags. As previously discussed, the executor tags specify an executor to be run to extract data from an install unit associated with the particular component product being processed. Also, as previously discussed, the static data tags specify static data to be retrieved from a static data source.

The method also includes an operation 403 for identifying a number of component products to be integrated together in a software system. In one embodiment, the number of component products to be integrated together in the software system are identified through receipt of user-supplied input. The method further includes an operation 405 for generating a CP XML file for each component product identified in operation 403 according to the component product XML schema generated in operation 401. Generating the CP XML file for a particular component product includes parsing the CP XML schema generated in operation 401 to identify tags defined to direct retrieval of data associated with installation of the particular component product. As previously described, executor tags direct retrieval of data from an install unit associated with the particular component product for which the CP XML file is being generated. Also, as previously described, static data tags direct retrieval of data from a static data source associated with the integrated software system to be built.

Each data item retrieved according to the direction of a particular identified tag within the CP XML schema is stored in the CP XML file in association with the particular identified tag. Thus, the CP XML schema defines the structure, content, and semantics of the generated CP XML files using XML syntax. To be considered valid, elements and attributes in the generated CMP XML file should follow the structure defined in the CP XML schema. It should be appreciated that use of the CP XML schema to generate the CP XML file for each component product ensures validity and interoperability of the data stored within each generated CP XML file. Thus, in one embodiment, each generated CP XML file is defined to include the same sections previously described with respect to the example CP XML schema structure of FIG. 3.

The method continues with an operation 407 for using the generated CP XML files to verify compatibility of the identified component products when integrated together in the integrated software system. In one embodiment, the operation 407 includes identifying resource requirement conflicts among component products, namespace conflicts among component products, release cycle conflicts among component products, and component product-to-component product dependency conflicts. Additionally, in one embodiment, the resources considered in identifying resource requirement conflicts include ports, environment variables, storage media locations, and memory locations. It should be appreciated that in other embodiments, verification of compatibility of the identified component products can include identification of other conflicts not specifically identified above. Also, it should be appreciated that in other embodiments, resources other than those specifically identified above can be considered in identifying resource requirement conflicts.

The method then proceeds to a decision operation 409 to determine whether the compatibility verification of operation 407 has identified any compatibility problems. If compatibility problems have been identified, the method proceeds to an operation 411 in which the compatibility problems are resolved, or at least attempted to be resolved. In one embodiment, resolution of the compatibility problems can be implemented by adjusting appropriate data within the CP XML file(s) of one or more component products associated with the compatibility problem. After completion of operation 411, the method reverts back to operation 407 to once again verify compatibility among the component products using the CP XML files. If the decision operation 409 indicates that there are no compatibility problems, the method proceeds to an operation 413 in which an indication is provided that the integrated software system is ready for building.

Figure 5:
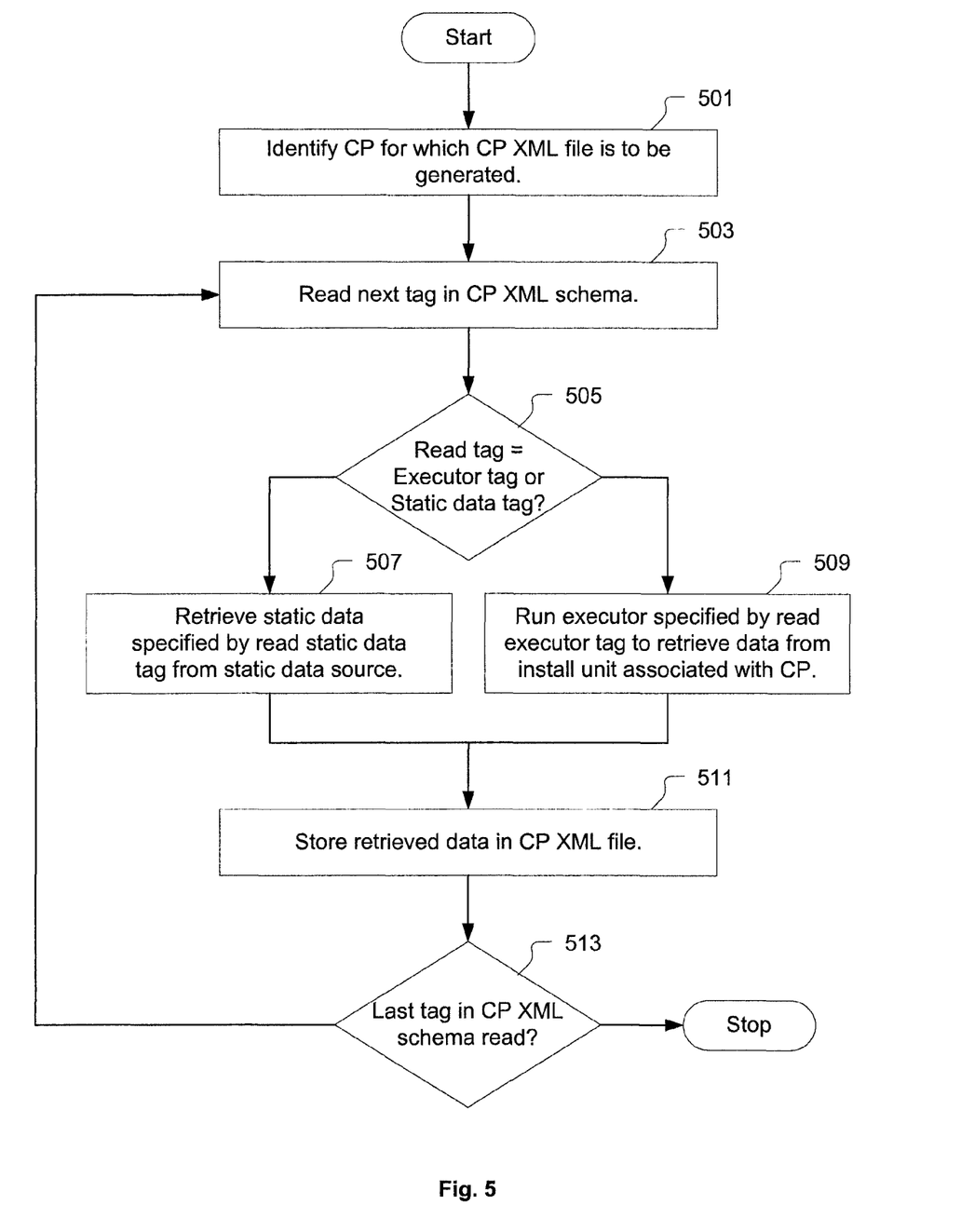
FIG. 5 is an illustration showing a flowchart of a method for generating a CP XML file to be used in performing a component product integration sync, in accordance with one embodiment of the present invention.

FIG. 5 is an illustration showing a flowchart of a method for generating a CP XML file to be used in performing a component product integration sync, in accordance with one embodiment of the present invention. It should be appreciated that the method of FIG. 5 is an expanded description of the operation 405 for generating a CP XML file for each identified component product, as previously discussed with respect to the method of FIG. 4. The method includes an operation 501 for identifying a component product for which a CP XML file is to be generated. In an operation 503, a next tag in the CP XML schema is read. It should be appreciated that the CP XML schema is read in a line-by-line, top-to-bottom manner. As previously discussed, the CP XML schema includes a number of tags which define a framework of data necessary to describe implementation of the component product with the integrated software system.

The method continues with an operation 505 in which the tag read in operation 505 is identified as representing either an executor tag or a static data tag. If the tag read in operation 505 represents an executor tag, the method proceeds with an operation 509 in which an executor specified by the executor tag is run. The executor functions to retrieve particular data from an install unit associated with the component product. In one embodiment, the particular data to be retrieved can be identified within the executor tag and passed as input to the executor. In another embodiment, the particular data to be retrieved can be embedded within the executor code. Once the appropriate data is retrieved by the executor in operation 509, the method proceeds with an operation 511 in which the data retrieved by the executor is stored in the CP XML file being generated. In one embodiment, the data retrieved by the executor is stored in the CP XML file in association with the executor tag that directed the executor to be run.

If the tag read in operation 505 represents a static data tag, the method proceeds with an operation 507 in which static data specified by the static data tag is retrieved from a static data source. Once the appropriate static data is retrieved in operation 507, the method proceeds with the operation 511 in which the data retrieved from the static data source is stored in the CP XML file being generated. In one embodiment, the data retrieved from the static data source is stored in the CP XML file in association with the static data tag that directed the static data to be retrieved. From operation 511, the method proceeds to a decision operation 513 for determining whether the last tag in the CP XML schema has been read. If the last tag has not yet been read, the method reverts back to operation 503 to read the next tag in the CP XML schema. If the last tag has been read, the CP XML file generation is complete and the method concludes.

In one embodiment, the CP XML file includes the sections corresponding to the CP XML schema structure previously described with respect to FIG. 3. More specifically, the CP XML file includes a section for identifying the component product and a platform required by the component product. A section is then provided for identifying sub-components of the component product. It should be appreciated that each sub-component can be represented as a component product itself. Therefore, it is possible to have nested component products or a component product hierarchy. A section is then provided for identifying install units of the identified sub-components of the component product. A section is then provided for specifying dependencies between the component product and other component products. A section is then provided for specifying resources required by the component product and the identified sub-components of the component product.

In one embodiment, a database schema is defined to organize and maintain the various integration data present within the generated CP XML files. A database instantiated according to the database schema can be populated with the integration data from the various CP XML files. Population of the database can be performed as each CP XML file is generated or upon completion of the CP XML file generation for the complete integrated software system. Once the database is populated with the integration data for the component products of the integrated software system, the database can be queried to provide integration data necessary to support a pre-integration audit of the software system to be built.

In one embodiment, an auditing XML schema is developed for use in specifying auditing rules to be applied during a pre-integration audit of the system to be built. The integration data within the database is analyzed against the auditing rules to determine whether any problems or conflicts exist with respect to integration of the various component products together in the software system. Appropriate measures can be taken to resolve each identified problem or conflict. Once the integration data passes the audit without identification of problems or conflicts, the integrated software system can be built with a high expectation of success.

Table 1 presents an example CP XML schema defined for an integrated software system referred to as "Setup SDK InstallBuilder." Table 2 presents an example CP XML file generated for a component product of the Setup SDK InstallBuilder system referred to as "SunONEWebServer." The CP XML file of Table 2 is generated using the CP XML schema of Table 1, in accordance with the methods of FIGS. 4 and 5.

TABLE 1

Example CP XML Schema

```
<xs:complexType name="pkgunitType">
    <xs:sequence>
        <xs:element name="pkgVariable" type="pkgVariableType" minOccurs="0" maxOccurs="unbounded"/>
    </xs:sequence>
    <xs:attribute name="pkgListenerClass" type="xs:string"/>
    <xs:attribute name="pkgRelativePath" type="xs:string"/>
    <xs:attribute name="pkgName" type="xs:string" use="required"/>
    <xs:attribute name="pkgVersion" type="xs:string" use="required"/>
    <xs:attribute name="pkgVendor" type="xs:string"/>
    <xs:attribute name="pkgObjectName" type="xs:string"/>
    <xs:attribute name="pkgAdminDir" type="xs:string"/>
    <xs:attribute name="pkgResponseDir" type="xs:string"/>
    <xs:attribute name="pkgSizeCheck" default="buildtime">
    </xs:simpleType>
    <xs:restriction base="xs:NMTOKEN">
        <xs:enumeration value="buildtime"/>
        <xs:enumeration value="runtime"/>
    </xs:restriction>
    </xs:simpleType>
    </xs:attribute>
    <xs:attribute name="pkgEmbed" type="xs:boolean" default="true">
    </xs:attribute>
    <xs:attribute name="retain" type="xs:boolean" default="false">
    </xs:attribute>
</xs:complexType>
```

TABLE 2

Example CP XML File Generated Using CP XML Schema of Table 1

Sample data obtained after mining pkgUnit using executor for tokens for pkgUnitType

```
<pkgunit pkgEmbed="false"
pkgListenerClass="com.sun.entsys.installer.common.config.ListenerSkipExistingPackage"
    pkgName="SUNWamfcd"
    pkgObjectName="SUNWamfcd"
    pkgRelativePath=". . . /Product/identity_svr/Packages"
    pkgVersion="7.1">
    <pkgVariable key="IS_INSTALL_DIR" name="BASEDIR"/>
    <pkgVariable key="IS_INSTALL_DIR" name="basedir"/>
</pkgunit>
<xs:complexType name="rpmunitType">
    <xs:attribute name="rpmUniqueName" type="xs:string" use="required"/>
```

TABLE 2-continued

Example CP XML File Generated Using CP XML Schema of Table 1

```
    <xs:attribute name="rpmVersion" type="xs:string" use="required"/>
    <xs:attribute name="rpmPath" type="xs:string" use="required"/>
    <xs:attribute name="rpmInstallPath" type="xs:string"
use="required"/>
    <xs:attribute name="rpmEmbed" type="xs:boolean" default="true">
    </xs:attribute>
    <xs:attribute name="rpmRelocate" type="xs:boolean"
default="false">
    </xs:attribute>
    <xs:attribute name="rpmListenerClass" type="xs:string"/>
    <xs:attribute name="retain" type="xs:boolean" default="false">
    </xs:attribute>
    </xs:complexType>
Sample data obtained after mining rpmUnit using executor for tokens for
rpmUnitType
    <rpmunit rpmEmbed="false"
    rpmInstallPath="{wsvar (CMN__IS__INSTALLDIR)}"
rpmListenerClass="com.sun.entsys.installer.common.config.ListenerSkipExi
stingPackage"
    rpmPath=" . . . /Product/identity_svr/Packages/sun-identity-services-
7.1-1.i686.rpm"
    rpmRelocate="true"
    rpmUniqueName="sun-identity-services"
    rpmVersion="7.1-1"/>
```

As discussed above, the integration sync process of the present invention provides an efficient and robust process for resolving component product interface issues associated with an integrated software system, to enable successful and reliable building of the integrated software system. It should be appreciated that the integration sync process of the present invention provides a low-touch, automated solution that enables handling of many component products that are distributed across campuses, time-zones, and geographies. The integration sync process is multi-purpose, reusable, user-configurable, and can be implemented in a multi-platform manner. It should be appreciated that the integration sync process is sufficiently generic to be applied to any complex consolidation of component products to create an integrated software system. The integration sync process in flexible and metadata driven, such that use of plain English leads to multiple uses of the same data. Additionally, generation of CP XML files in accordance with the integration sync process enables generation of an integration database. The integration database in turn enables a powerful audit capability that is independent of any particular package-based framework.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be connected to a network of coupled computer systems so that the computer readable code stored on the computer readable medium can be executed in a distributed fashion within the network of coupled computer systems.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for performing a component product integration synchronization, comprising:
   generating a component product extensible markup language (XML) schema;
   identifying a number of component products to be integrated together in a software system;
   generating a component product XML file for each identified component product according to the generated component product XML schema, wherein the component product XML file for a given component product is generated by searching an install unit of the given component product, extracting data pertinent to installation of the given component product from the install unit of the given component product, and storing this extracted data in the component product XML file for the given component product, wherein the install unit of the given component product includes instructions and data for installing the given component product in a stand-alone manner;
   using the data stored in the generated component product XML files to identify and resolve component product interface problems associated with component product specifications and dependencies prior to integrating the number of component products together in the software system; and
   integrating the number of component products into the software system using only data stored in the generated component product XML files, wherein the integrating is performed without running the install units respectively associated with the number of component products to direct installation of the number of component products.

2. A computer implemented method for performing a component product integration synchronization as recited in claim 1, wherein the component product XML schema includes a number of tags which define a framework of data necessary to describe implementation of a particular component product with the software system.

3. A computer implemented method for performing a component product integration synchronization as recited in claim 2, wherein the number of tags include executor tags and static data tags, the executor tags specifying an executor to be run to extract data from an install unit associated with the particular component product, the static data tags specifying static data to be retrieved from a static data source.

4. A computer implemented method for performing a component product integration synchronization as recited in claim 1, wherein identifying the number of component products to be integrated together in the software system is performed by receipt of user-supplied input.

5. A computer implemented method for performing a component product integration synchronization as recited in claim 1, wherein generating the component product XML file for a particular component product includes parsing the generated component product XML schema to identify tags defined to direct retrieval of data associated with installation of the particular component product.

6. A computer implemented method for performing a component product integration synchronization as recited in claim 5, wherein a portion of the identified tags direct retrieval of data from an install unit associated with the particular component product.

7. A computer implemented method for performing a component product integration synchronization as recited in claim 5, wherein a portion of the identified tags direct retrieval of data from a static data source associated with the software system.

8. A computer implemented method for performing a component product integration synchronization as recited in claim 5, wherein each data item retrieved according to the direction of a particular identified tag within the component product XML schema is stored in the component product XML file in association with the particular identified tag.

9. A computer implemented method for performing a component product integration synchronization as recited in claim 1, wherein using the generated component product XML files to verify compatibility of the identified component products when integrated together in the software system includes identifying resource requirement conflicts among component products, namespace conflicts among component products, release cycle conflicts among component products, and component product-to-component product dependency conflicts.

10. A computer implemented method for performing a component product integration synchronization as recited in claim 9, wherein resources considered in identifying resource requirement conflicts include ports, environment variables, storage media locations, and memory locations.

11. A computer implemented method for performing a component product integration synchronization as recited in claim 1, wherein the component product XML file generated for a particular identified component product includes,
   a section for identifying the particular component product and a platform required by the particular component product,
   a section for identifying sub-components of the particular component product,
   a section for identifying install units of the identified sub-components of the particular component product,
   a section for specifying dependencies between the particular component product and other component products, and
   a section for specifying resources required by the particular component product and the identified sub-components of the particular component product.

12. A computer implemented method for generating a component product extensible markup language (XML) file to be used in performing a component product integration synchronization, comprising:
   (a) identifying a component product for which a component product XML file is to be generated;
   (b) reading a tag in a component product XML schema;
   (c) identifying the tag read in operation (b) as representing an executor tag;
   (d) in response to operation (c), running an executor specified by the executor tag to retrieve data pertinent to installation of the component product from an install unit associated with the component product without running the install unit, wherein the install unit of the component product includes instructions and data for installing the given component product in a stand-alone manner;
   (e) in response to operation (d), storing the retrieved data in the component product XML file;
   (f) identifying the tag read in operation (b) as representing a static data tag;
   (g) in response to operation (f), retrieving static data associated with the static data tag from a static data source that includes data which is not subject to variation among different component products;

(h) in response to operation (g), storing the retrieved static data in the component product XML file; and (i) repeating operations (b) through (h) until each tag instance in the component product XML schema has been read once and in a sequential manner beginning with a first tag present in the component product XML schema.

13. A computer implemented method for generating a component product XML file to be used in performing a component product integration synchronization as recited in claim 12, wherein the component product XML schema includes a number of tags which define a framework of data necessary to describe implementation of the component product with the software system.

14. A computer implemented method for generating a component product XML file to be used in performing a component product integration synchronization as recited in claim 12, wherein the retrieved data stored in the component product XML file in operation (e) is stored in association with the executor tag, and wherein the retrieved static data stored in the component product XML file in operation (h) is stored in association with the static data tag.

15. A computer implemented method for generating a component product XML file to be used in performing a component product integration synchronization as recited in claim 12, wherein the component product XML file includes, a section for identifying the component product and a platform required by the component product, a section for identifying sub-components of the component product, a section for identifying install units of the identified sub-components of the component product, a section for specifying dependencies between the component product and other component products, and a section for specifying resources required by the component product and the identified sub-components of the component product.

16. A computer implemented method for generating a component product XML file to be used in performing a component product integration synchronization as recited in claim 15, wherein the resources to be specified include ports, environment variables, storage media locations, and memory locations.

17. A computer readable storage medium including program instructions for performing a component product integration synchronization, comprising:

program instructions for obtaining a component product extensible markup language (XML) schema;

program instructions for obtaining a respective identifier for a number of component products to be integrated;

program instructions for generating a component product XML file for each identified component product to be integrated, wherein the component product XML file is to be generated according to the obtained component product XML schema, wherein the component product XML file for a given component product is generated by searching an install unit of the given component product, extracting data pertinent to installation of the given component product from the install unit of the given component product, and storing this extracted data in the component product XML file for the given component product, wherein the install unit of the given component product includes instructions and data for installing the given component product in a stand-alone manner;

program instructions for using the data stored in the generated component product XML files to identify and resolve component product interface problems associated with component product specifications and dependencies prior to integrating the number of component products together to form a system; and integrating the number of component products into the system using only data stored in the generated component product XML files, wherein the integrating is performed without running the install units respectively associated with the number of component products to direct installation of the number of component products.

18. A computer readable storage medium including program instructions for performing a component product integration synchronization as recited in claim 17, wherein the component product XML schema includes a number of tags which define a framework of data necessary to describe implementation of a component product within the software system.

19. A computer readable storage medium including program instructions for performing a component product integration synchronization as recited in claim 17, wherein the program instructions for using the data stored in the generated component product XML files to identify and resolve component product interface problems includes program instructions for identifying resource requirement conflicts among component products, namespace conflicts among component products, release cycle conflicts among component products, and component product-to-component product dependency conflicts.

20. A computer readable storage medium including program instructions for performing a component product integration synchronization as recited in claim 17, wherein the program instructions for generating a component product XML file for each identified component product to be integrated include program instructions for, (a) selecting one of the identified component products for which a corresponding component product XML file is to be generated;

(b) reading a next tag in a component product XML schema;

(c) identifying the tag read in operation (b) as representing an executor tag;

(d) in response to operation (c), running an executor specified by the executor tag to retrieve data from an install unit associated with the selected component product;

(e) in response to operation (d), storing the retrieved data in the corresponding component product XML file;

(f) identifying the tag read in operation (b) as representing a static data tag;

(g) in response to operation (f), retrieving static data associated with the static data tag from a static data source;

(h) in response to operation (g), storing the retrieved static data in the corresponding component product XML file; and (i) repeating operations (b) through (h) until each tag instance in the component product XML schema has been read once and in a sequential manner beginning with a first tag present in the component product XML schema.

* * * * *